US006655531B1

(12) United States Patent
Beard et al.

(10) Patent No.: US 6,655,531 B1
(45) Date of Patent: Dec. 2, 2003

(54) PRESSURE FILTRATION DEVICE

(75) Inventors: Jon O. Beard, East Taunton, MA (US); John C. Rogers, Walpole, MA (US)

(73) Assignee: Baker Hughes Incorporated, Houston, TX (US)

(*) Notice: Subject to any disclaimer, the term of this patent is extended or adjusted under 35 U.S.C. 154(b) by 0 days.

(21) Appl. No.: 09/979,339

(22) PCT Filed: May 23, 2000

(86) PCT No.: PCT/US00/14182
§ 371 (c)(1),
(2), (4) Date: Feb. 8, 2002

(87) PCT Pub. No.: WO00/71226
PCT Pub. Date: Nov. 30, 2000

(51) Int. Cl.[7] ............................................. B01D 33/06
(52) U.S. Cl. .................. 210/391; 210/396; 210/398; 210/402; 210/407; 210/418
(58) Field of Search ................. 210/391, 392, 210/396, 398, 402, 406, 407–409, 416.1, 418, 472; 222/368; 414/219

(56) References Cited

U.S. PATENT DOCUMENTS

| 4,179,043 A | 12/1979 | Fischer ..................... 222/368 |
| 4,279,760 A | 7/1981 | Yamamoto ................ 210/784 |
| 4,342,638 A | 8/1982 | Dahlstrom ................ 210/772 |
| 4,861,494 A | 8/1989 | Bratten ..................... 210/739 |
| 5,053,082 A | 10/1991 | Flanigan et al. .......... 134/25.1 |
| 5,080,803 A | 1/1992 | Bagatto et al. ........... 210/709 |
| 5,093,001 A | 3/1992 | Ueda ........................ 210/403 |
| 5,167,806 A | 12/1992 | Wang et al. .............. 210/188 |
| 5,175,355 A | 12/1992 | Streich et al. ............ 562/485 |
| 5,252,224 A | 10/1993 | Modell et al. ............ 210/695 |
| 5,407,561 A | 4/1995 | Iida et al. ................. 210/406 |
| 5,470,473 A | 11/1995 | Park et al. ................ 210/402 |
| 5,643,468 A | * 7/1997 | Ure ........................... 210/188 |
| 5,718,510 A | 2/1998 | Farmery et al. ........... 366/266 |
| 5,806,977 A | 9/1998 | Farmery et al. ........... 366/348 |
| 5,897,775 A | * 4/1999 | Kihlstrom ................. 209/246 |

FOREIGN PATENT DOCUMENTS

JP            11179115       6/1999

* cited by examiner

Primary Examiner—Peter A. Hruskoci
(74) Attorney, Agent, or Firm—R. Neil Sudol; Henry Coleman; William Sapone

(57) ABSTRACT

An assembly for separating solid phase material from a slurry that comprises a pressurized filtration unit including a vessel and filter media. A slurry is fed to the filtration unit where it is separated into a solid phase material and a liquid phase material. The filtration unit has a solid outlet for discharging the solid phase material to a material transport. The material transport moves the solid phase material to a depressurizing chamber that has a lower pressure than the filtration unit. As the solid phase material enters the depressurizing chamber it is exposed to the lower pressure of that chamber. The material transport maintains the pressure difference between the filtration unit and the chamber. Subsequently, the depressurized solid phase material can be conveyed to other equipment for drying or other processing.

19 Claims, 1 Drawing Sheet

PRESSURE FILTRATION DEVICE

BACKGROUND OF THE INVENTION

This invention relates to a filtration device and associated method for separating a slurry into solid and liquid phases. More particularly, this invention relates to a pressure filtration device and associated method for continuously separating solid phase material from a slurry and rapidly depressurizing that material.

In the production and processing of chemicals, it is frequently necessary to separate solid material from a slurry. For example, slurries are produced by chemical reactors and precipitation units. Solid material is typically separated from the slurry by filtration or centrifugal separation. Suitable filtration methods include gravitational, vacuum-assisted and pressure filtration. For example, in the production of purified terephthalic acid, crystals of terephthalic acid are conventionally separated from a slurry using a rotary vacuum filtration unit. The filtration unit has a cylindrical filter drum rotatably mounted inside a housing. As the slurry is fed into the filtration unit housing, a pressure differential is created inside the filter to move the liquid portion of the slurry through the filter media. The crystals are deposited in a layer on the outer cylindrical surface of the drum.

Following separation of the solid material from the slurry, the solid material removed from the filter media, typically as a cake of solid phase material, prior to subsequent processing or disposal. In some applications, a jet of pressurized gas removes the solid material from the filter media and pushes that material to a discharge outlet. Where pressure filtration is used, certain processes may require that the solid material is discharged to lower pressure (such as atmospheric conditions) for downstream processing. For continuous processing operations, it may also be desired that the pressure differential in the filtration unit not be significantly disrupted.

U.S. Pat. No. 5,093,001 discloses a pressurized filtration unit that has a pair of valves at the output to provide for the discharge of material. This patent is incorporated by reference herein. That configuration, however, is not sufficient to solve the pressure control problem and to maintain a high level of throughput of material through the filtration unit. U.S. Pat. Nos. 5,589,079 and 5,470,473 disclose a pair of valve units and hoppers that provide for batch processing of solid material from a pressurized filtration unit. These patents are incorporated by reference herein. Each valve unit may have a dome-shaped valve member. In operation, solid material is discharged from the filtration unit into a first hopper. A valve unit attached to the first hopper seals that hopper while the pressure is equalized between the first hopper and the second hopper. That pressure is intermediate the initial pressure and the final, lower pressure. After the pressure is equalized between the hoppers, the solid material is then transferred to the second hopper. The second hopper is depressurized to the final, lower pressure, and then the solid material is discharged to a storage vessel or conveyer. While the disclosed apparatus and method are superior to prior devices and methods, that apparatus and method are limited to batch processing of solid material. The multi-stage, batchwise processing requirements create a bottleneck that preclude high speed, continuous throughput of material. The valve units and pressure equalization equipment also require frequent maintenance to keep that equipment working efficiently. Thus, there is a need for a pressure filtration unit that provides for continuous processing of solid material. In particular, there is a need for a pressure filtration apparatus that provides for the continuous processing of slurry by rapidly decompressing solid phase material separated from the slurry while maintaining the pressure difference between the filtration unit and the downstream equipment.

SUMMARY OF THE INVENTION

An assembly for continuously recovering solid phase material from a slurry comprises, in accordance with the present invention, a pressurized filtration unit including a vessel having filter media for separating the solid phase material from the slurry. The filtration unit has a slurry input and, optionally, a source of inert gas. A liquid outlet discharges liquid phase material from that unit. Gas can also be discharged through the liquid outlet, depending on the design of the filtration unit. A solids outlet discharges solid phase material from the filtration unit. The filtration unit can optionally include a washing apparatus for dispensing a washing fluid or liquor onto a cake of material that is deposited on the filter media. The washing fluid is displaces other liquids and/or impurities in the cake.

A material transport continuously moves solid phase material from the solids outlet of the filtration unit to a depressurizing chamber. The depressurizing chamber has a lower pressure than the filtration unit to facilitate subsequent processing of that material. As the solid phase material is transported into the depressurizing chamber, that material is directly and rapidly depressurized to the lower pressure of that chamber. Advantageously, the rapid depressurization can cause "flashing" of the solid phase material, which removes residual liquid, gas and volatile substances from that material. The depressurizing chamber may further include one or more outlets for releasing the vapor, gas and/or volatile substances from that chamber. The depressurizing chamber can contain an inert gas to stabilize reactive or otherwise unstable solid phase material. Any suitable conveyance can remove the solid phase material from the chamber for subsequent processing, such as drying.

The material transport generally includes an inlet for receiving solid phase material from the solids outlet of the filtration unit. That material is discharged under pressure into the material transport inlet. It is a feature of the present invention that the material transport maintains the pressure difference between the filtration unit and the depressurizing vessel. The solid phase material is transported to an outlet where it is discharged into the depressurizing chamber. That material is rapidly depressurized as it is exposed to the lower pressure of the depressurizing chamber.

In another aspect, a system of one or more filtration units, depressurizing units and material transports is provided. Such a system can further include one or more chemical reactors or precipitators that provide a source of slurry to the filtration units. One or more downstream conveyors and/or dryers can aid in further processing of the solid phase material. The conveyor may be a screw conveyor or other type of conveyance.

In accordance with another aspect, a method for separating solid phase material from a slurry includes the steps of (a) providing a filtration unit having a vessel maintained at a first pressure and having filter media, (b) introducing a slurry to the vessel, (c) separating the slurry into a solid phase material and a liquid phase material, (d) continuously transporting the solid phase material to a depressurizing chamber while maintaining the pressure difference between the filtration unit and the chamber, and (e) rapidly depressurizing the solid phase material as it enters the depressurizing chamber. The solid phase material is maintained at substantially the first pressure until it enters the depressurizing chamber, although a minor amount of controlled pressure leakage during transportation of the solid phase material may be permitted. Further steps include (f) providing the slurry from a chemical reactor; and (g) conveying the depressurized solid phase material to a dryer.

DETAILED DESCRIPTION OF THE PREFERRED EMBODIMENTS

Figure 1:
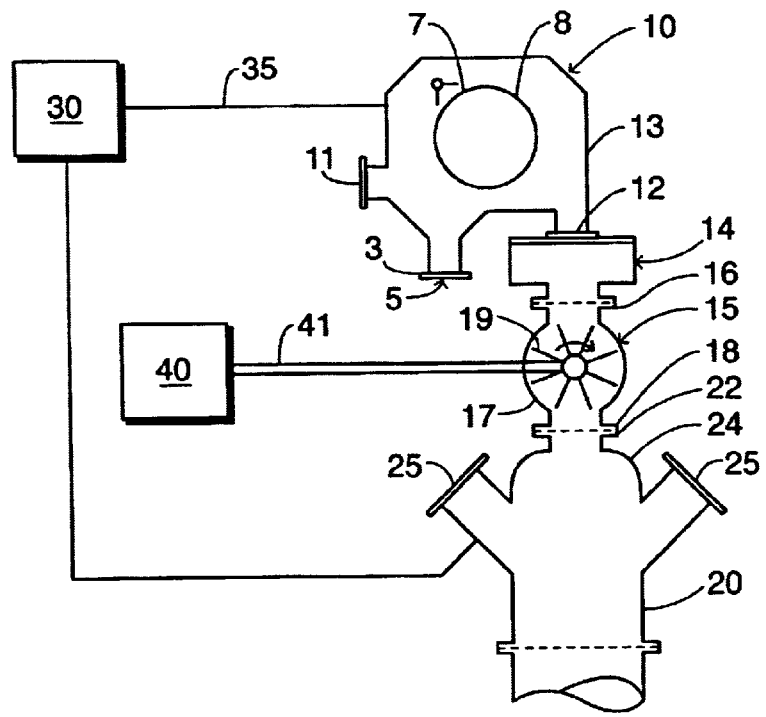
FIG. 1 is a side view of a pressurized filtration unit with portions of the vessel wall cut away.

Referring to FIG. 1, there is generally indicated an assembly for separating solid phase material from a slurry 5. The assembly includes a filtration unit 10 with a solids outlet 12 for discharging solid phase material separated from the slurry by filtration unit 10. A liquids outlet 11 provides for the discharge of liquid phase material and, optionally, gaseous material. A material transport 15 is connected to filtration unit 10 at solids outlet 12. Optionally, the filtration unit 10 and material transport 15 can be interconnected by an adapter 14. Such an adapter 14 is particularly useful for retrofitting filtration units. Material transport 15 is connected at its downstream side to a depressurizing chamber 20. Chamber 20 preferably has one or more outlets 25 for the discharge of vapor, gas and/or volatile substances (generally "vapor") from that chamber 20. Chamber 20 can be further connected to a conveyer and/or dryer (not shown) for further processing of the solid phase material.

Filtration unit 10 includes a vessel 13 for containing the slurry 5 and filter media 8. The filtration unit 10 can be any device for separating the slurry 5 into solid phase and liquid phase materials. Because filtration unit 10 is pressurized, it is advantageously either cylindrical or spherical, although other configurations are possible. For example, filtration unit 10 can be a pressurized, rotary drum filtration unit as disclosed in U.S. Pat. Nos. 5,589,079; 5,470,473 and 2,352,303, the disclosures of which are incorporated by reference herein. Slurry 5 is provided to filtration unit 10 from a suitable source, such as, for example, a chemical reactor or precipitation unit (not shown). The slurry 5 is fed into the filtration unit 10 through an inlet 3. The inlet 3 can be located and structured to introduce the slurry 5 into the unit 10 according to the design and function of that particular filtration unit, which is well known to those skilled in the art. Other pressurized filtration units, such as pressurized disc filter units, are also suitable for use in the present invention.

Filtration unit 10 is pressurized to facilitate separation of the slurry 5 into solid phase material and liquid phase material by filter media 8. Filtration unit 10 is pressurized, according to the design of that unit. For example, referring to FIG. 1, filtration unit 10 is pressurized from a source 30 of pressurized gas, such as an inert gas. Other methods of pressurizing filtration unit 10 are possible, such as introducing a pressurized slurry into unit 10.

The filter media 8 separates the slurry into liquid phase and solid phase material. Filter media 8 is selected according to the slurry being separated. For example, filter media 8 can be a layer of cloth fiber or stainless steel provided along the outer surface of a steel drum. For certain applications, the filter media is preferably capable of withstanding elevated temperature as well as elevated pressure. As used herein, "liquid phase material" means liquid separated from the slurry, although that liquid may contain some suspended solid material. The term "solid phase material" means the material that is separated from that slurry by the filter media 8, such as a "cake" that is deposited on that filter media. The solid phase material may also contain substantial liquid, such as, for example, liquid that is not separated from the solid phase material and/or washing fluid. The temperature of the solid phase material can be greater than the atmospheric boiling point of the liquid contained in that material. For such hot material, when that material is rapidly decompressed, or flashed, the liquid rapidly vaporizes as the pressure, or pressure and temperature, are lowered. For example, when a pressurized solid phase material, that contains water and has a temperature greater than 212° F., is rapidly depressurized to atmospheric pressure, the water in that material will rapidly vaporize to form vapor. Other pressurized, heated, liquid-containing solid phase material can be processed using this equipment.

Filtration unit 10 may optionally include a washing apparatus 7 for dispensing a washing fluid or liquor onto a cake that is deposited on filter media 8 during the filtration process. The washing fluid can be ejected under pressure through the cake or solid phase material and into the filter. The washing fluid may displace residual moisture in the cake, remove impurities in the cake and/or displace the liquid in the cake with the washing fluid. For example, the washing fluid can be water that is used to displace acetic acid from terephthalic acid crystals before that material is discharged from the solids outlet 12. A suitable washing apparatus may include, for example, headers spanning vessel 13 that eject the washing liquid into the cake. Other washing fluid and apparatuses are possible.

The solid phase material can be discharged from the filter media by any suitable mechanism, as will be appreciated by those skilled in the art. For example, a jet of pressurized gas from inside the rotating cylindrical filter can push a deposited cake from the outer surface of the filter media and into the solids outlet 12. Similarly, the cake can be mechanically removed from the filter media 8 by a scraper or similar device (not shown). Other apparatuses for discharging solid phase material from the filtration unit are possible and within the scope of the present invention.

Material transport 15 has an inlet 16 for receiving solid phase material from the solids outlet 12 of the filtration unit 10. Because inlet 16 is in communication with filtration unit 10, that inlet is pressurized. Material transport 15 moves solid phase material to an outlet 18. The movement of solid phase material is preferably continuous such that that material moves from the inlet to the outlet without stepwise decompression or equalization of pressure between the filtration unit 10 and the depressurizing chamber 20. Material transport 15 maintains the pressure difference between the filtration unit 10 and the depressurizing chamber 20 while the solid phase material is being continuously moved through that apparatus. For example, as illustrated in FIG. 1 material transport 15 can be a rotary valve. That valve has a plurality of rotatably mounted vanes 19. As solid phase material is deposited between the vanes, it is moved to outlet 18. Vanes 19 preferably sealingly engage the inside surfaces 17 of the rotary valve to maintain the pressure difference between the filtration unit 10 and the depressurizing chamber 20. Vanes 19 can also permit a minor amount of controlled leakage of pressure past those vanes, such that the cake on the filter media 8 is not displaced and such that the pressure difference is maintained between the filtration unit 10 and the depressurizing chamber 20. Other material transports 15 are possible.

Material transport 15 is operated by any suitable mechanism. For example, referring to FIG. 1, material transport 15 is operated by drive 40 and bearing assembly and driveshaft 41. Drive 40 may be, for example, an electric motor or combustion engine or other device for providing mechanical power to material transport 15.

Depressurizing chamber 20 has a solids inlet 22 for receiving solid phase material transported from the filtration unit 10. Side walls 24 contain the solid phase material as it enters, or is exposed to, the lower pressure in the depressurizing chamber 20. The lower pressure of chamber 20 is preferably about atmospheric pressure, although higher and lower pressures can be used in chamber 20. Depressurizing chamber 20 has at least one outlet 25 for discharging vapor that is formed upon exposure of the solid phase material to the lower pressure in that chamber. An outlet 25 can be vented to the atmosphere or connected to a storage and/or recovery system (not shown). Such a system can aid in the cleaning and recovery of gases or vaporized liquids that are released from the depressurizing tank 20.

Depressurizing chamber 20 can, optionally, contain a gas, such as an inert gas, to limit the reactivity of solid phase material and/or to blanket the process to prevent ignition. For example, referring to FIG. 1, depressurizing chamber 20 is connected to a source 30 of an inert gas, such as nitrogen, argon, helium or carbon dioxide. As will be appreciated by those of skill in the art, the gas is selected according to the reactivity of the solid phase material.

Figure 2:
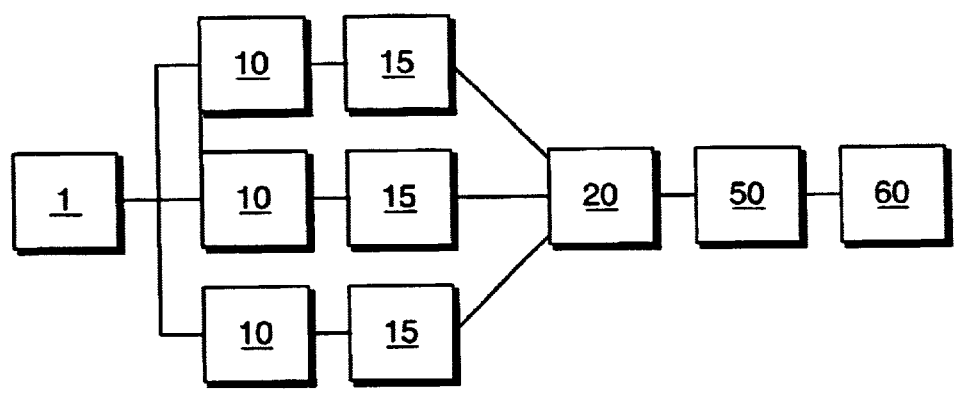
FIG. 2 is a flow diagram of one embodiment of a pressurized filtration system.

In another aspect, a slurry filtration system is provided. One or more filtration units 10 can be connected to one or more material transports 15 and one or more depressurizing chambers 20. Referring to FIG. 2, an example of such a system is depicted. A source 1 provides slurry 5 to filtration units 10. Source 1 can include a chemical reactor, precipitation unit, extraction unit, waste processor, or other suitable supply of a slurry containing solid and liquid phase materials. Each filtration unit 10 is connected to a material transport 15. Material transports 15 move solid phase material to a common depressurizing chamber 20, although multiple depressurizing chambers 20 could also be used. Solid phase material is conveyed from depressurizing chamber 20 via a conveyer 50 (such as a screw conveyor or other mechanism adapted to transport that material) to a dryer or other solid phase material processing equipment 60. Conveyer 50 and equipment 60 are preferably adapted for continuous transport and processing. The rate of operation of conveyor 50 can be adjusted during use in accordance with the slurry feed rate and output rate of solid phase material. Other configurations of the system are possible.

In accordance with another aspect, a method for separating solid phase material from a slurry is provided. The method includes providing a filtration unit 10 having a vessel 13. The vessel 13 is maintained at a first pressure. The vessel contains filter media 8. A slurry 5 is introduced into vessel 13 through an inlet 3. The slurry 5 can be provided from any suitable source 1, such as a chemical reactor, precipitator, extraction unit, waste processor, or other suitable supply of a slurry containing solid and liquid phase materials. Slurry 5 is separated into a solid phase material and a liquid phase material using filter media 8. Optionally, the solid phase material may be washed. The solid phase material is then transported to a depressurizing chamber while maintaining the pressure difference between the filtration unit and that chamber. The solid phase material is preferably continuously moved or transferred from the filtration unit 10 to the depressurizing chamber 20 to provide for continuous filtration and processing of solid phase material. Advantageously, the solid phase material is directly and rapidly depressurized as it enters the depressurizing chamber, without the need for pressure equalizing equipment that is required in other methods. The solid phase material is preferably maintained at substantially the first pressure until it enters the depressurizing chamber. Alternatively, the solid phase material may be partially depressurized while it is transported from the filtration unit to the chamber. The depressurized solid phase material is conveyed from depressurizing chamber by any suitable conveying apparatus. Subsequent steps can include drying the solid phase material and/or providing that material to other equipment for additional processing or disposal.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An assembly for continuous pressure filtration of a slurry, the assembly comprising:

a pressurized filtration unit comprising a vessel maintained at a first pressure, filter media in said vessel for separating said slurry into a liquid phase material and a solid phase material, a liquid outlet for discharge of said liquid phase material, and a solids outlet for discharge of said solid phase material from said filtration unit;

a depressurizing chamber maintained at a second and lower pressure than said first pressure, said chamber having a solids inlet receiving said solid phase material from said filtration unit and containing the solid phase material as it is exposed to said second and lower pressure; and a material transport including a rotary vane valve disposed between said solids outlet of said filtration unit and said solids inlet of said chamber for maintaining the pressure difference between said filtration unit and said chamber and for continuously moving said solid phase material from said solids outlet of said filtration unit into said chamber whereby said solid phase material is depressurized from about said first pressure to said second and lower pressure.

2. The assembly according to claim 1, further comprising:
a source of slurry connected to said filtration unit.

3. The assembly according to claim 2,
wherein said source of said slurry is a chemical reactor.

4. The assembly according to claim 1, further comprising:
a source of an inert gas connected to said filtration unit.

5. The assembly according to claim 1, further comprising:
a dryer connected to said chamber for receiving solid phase material from said chamber.

6. The assembly according to claim 1, further comprising:
a conveyer for transporting solid phase material from said chamber to a dryer.

7. The assembly according to claim 1,
wherein said rotary vane valve has a housing with an inlet and an outlet and a rotor with a plurality of vanes, said housing inlet being in communication with said filtration unit outlet, said housing outlet being in communication with said depressurizing chamber inlet, at least some of said vanes exposed at said housing inlet, at least some of said vanes exposed at said housing outlet, and at some of said vanes in sealing engagement with said housing.

8. The assembly according to claim 1, wherein said filtration unit is a rotatably mounted cylindrical filter.

9. The assembly according to claim 1, wherein said solid phase material is crystalline at a temperature greater than the boiling temperature of the liquid at the second pressure.

10. A system for pressure filtration of a slurry, comprising:

at least one pressurized filtration unit comprising a vessel maintained at a first pressure, filter media in said vessel for separating said slurry into a liquid phase material and a solid phase material containing liquid, a liquid outlet for discharge of said liquid phase material, and a solids outlet for discharge of said solid phase material from the filtration unit;

a source of inert gas;

at least one depressurizing chamber receiving said inert gas and holding said inert gas at a second and lower pressure than said first pressure, said at least one chamber having an inlet receiving said solid phase material from said at least one filtration unit, said chamber containing the solid phase material as it is directly exposed to said second and lower pressure, and having an outlet for discharge of vapor formed upon exposure of said solid phase material to the lower pressure; and at least one material transport including a rotary vane valve disposed between said solids outlet of said filtration unit and said solids inlet of said at least one depressurizing chamber maintaining the pressure difference between said at least one filtration unit and said at least one chamber and moving said solid phase material from said solids outlet of said at least one filtration unit into said at least one chamber;

wherein said solid phase material has a temperature greater that the boiling temperature of the liquid contained in said solid phase material at said second pressure; and whereby said solid phase material is depressurized as it is exposed to said second and lower pressure such that the liquid in said solid phase material is vaporized.

11. The system according to claim 10, further comprising:

a source of slurry connected to said at least one filtration unit.

12. The system according to claim 11, wherein said source is a chemical reactor.

13. The system according to claim 10, further comprising:

a conveyer for conveying said solid phase material from said chamber.

14. The system according to claim 10, further comprising:

at least one dryer connected to said chamber for receiving said solid phase material.

15. The system according to claim 10, wherein said rotary vane valve has a housing with an inlet and an outlet and a rotor with a plurality of vanes, said housing inlet being in communication with said filtration unit outlet, said housing outlet being in communication with said depressurizing chamber inlet, at least some of said vanes exposed at said housing inlet, at least some of said vanes exposed at said housing outlet and at some of said vanes in sealing engagement with said housing.

16. The system according to claim 10, wherein said at least one filtration unit is a rotatably mounted cylindrical filter.

17. The system according to claim 10, wherein said solid phase material is crystalline.

18. The system according to claim 10, wherein said second pressure is atmospheric pressure.

19. The system according to claim 10, further comprising:

an adapter connecting said filtration unit to said material transport.

\* \* \* \* \*